(12) United States Patent
Poustie et al.

(10) Patent No.: US 6,711,604 B1
(45) Date of Patent: Mar. 23, 2004

(54) BINARY ADDER

(75) Inventors: Alistair James Poustie, Ipswich (GB); Keith James Blow, Woodbridge (GB); Robert John Manning, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/555,768

(22) PCT Filed: Dec. 8, 1998

(86) PCT No.: PCT/GB98/03655
§ 371 (c)(1),
(2), (4) Date: Jun. 5, 2000

(87) PCT Pub. No.: WO99/31562
PCT Pub. Date: Jun. 24, 1999

(30) Foreign Application Priority Data

Dec. 15, 1997 (GB) .......................................... N9726477

(51) Int. Cl.[7] .............................. G06F 7/50; G06E 1/04
(52) U.S. Cl. ........................................ 708/700; 708/191
(58) Field of Search ................................ 708/191, 700, 708/701, 702, 703, 704, 705, 706, 707; 250/216

(56) References Cited

U.S. PATENT DOCUMENTS

| | | | | |
|---|---|---|---|---|
| 5,068,815 A | * | 11/1991 | Mizushima et al. | 708/191 |
| 5,136,530 A | * | 8/1992 | Li et al. | 708/191 |
| 5,644,123 A | * | 7/1997 | Hait | 250/216 |

* cited by examiner

*Primary Examiner*—Chuong Dinh Ngo
(74) *Attorney, Agent, or Firm*—Nixon & Vanderhye P.C.

(57) ABSTRACT

The present invention relates to an apparatus for determining the sum of first and second optical binary words. The apparatus uses a first optical logic gate and a second optical logic gate to generate respective first and second combination words which represent a logical combination of the binary words applied to the respective logic gates. The first and second combination words are then offset by one bit slot with respect to each other by an offsetting device to generate first and second offset combination words. These offset combination words are repeatedly fed back to the first and second logic gates. The binary sum of the original two words is given by the first combination word when each bit slot of the second combination words has the same logical state.

14 Claims, 7 Drawing Sheets

BINARY ADDER

BACKGROUND OF THE INVENTION

1. Field of the Invention

The present invention relates to apparatus and a method for determining the sum of first and second optical binary words, each word having a number of optical bit slots.

2. Description of Related Art

In the field of all optical processing, optical signal streams are used for data processing applications. These optical streams consist of an optical pulse train that is divided into a series of bit slots. Each bit slot, which has a predetermined length within the pulse train, represents a single bit of data, with the presence or absence of an optical pulse within a bit slot representing complementary logical states. Thus, for example, the presence of an optical pulse may represent a binary "1", whilst the absence of an optical pulse may represent a binary "0", or vice versa. In this specification, therefore, we use the terminology "optical binary word" to mean a binary word represented optically in this manner.

One of the basic optical processing applications which is required is the ability to generate the binary sum of two optical binary words each word consisting of a number of bit slots.

SUMMARY OF THE INVENTION

According to a first aspect of the present invention, we provide apparatus for determining the sum of first and second optical binary words, each word having L optical bit slots, each bit slot representing a respective one of first and second logical states, the apparatus comprising a first optical logic gate which generates a first combination word representing a first logical combination of binary words applied thereto, a second optical logic gate which generates a second combination word representing a second logical combination of binary words applied thereto, offsetting means for offsetting the first and second combination words by one bit slot with respect to each other to generate first and second offset combination words, and means for repeatedly applying the previously generated first and second offset combination words to first and second logic gates which respectively generate first and second combination words representing the first and second logical combination of the binary words applied thereto, wherein the first and second offset combination words initially comprise the first and second binary words, the binary sum being given by the first combination word then each bit slot of the second combination word has the same logical state.

According to a second aspect of the present invention we provide a method for determining the sum of first and second optical binary words, each word having L optical bit slots, each bit slot representing a respective one of first and second logical states, the method comprising the steps of:

1) generating a first combination word representing a first logical combination of first and second offset combination words;
2) generating a second combination word representing a second logical combination of first and second offset combination words;
3) generating the first and second offset combination words by offsetting the first combination word by one bit slot with respect to the second combination word;
4) continuously repeating steps 1), 2) and 3) until each bit slot of the second combination word has the same logical state, wherein the first and second offset combination words initially comprise the first and second binary words, the binary sum being given by the first combination word when each bit slot of the second combination word has the same logical state.

Exemplary embodiments of an apparatus and a method of the present invention generate the sum of first and second optical binary words. This is achieved by generating first and second combination words representing first and second logical combinations of the optical binary words, using first and second optical logic gates. These optical combination words are then offset with respect to each other and recombined to generate further combination words. By repeating this process until each bit slot of the second combination word has the same logical state, the binary sum of the first and second binary words can be determined.

Typically the first and second logic gates have first and second inputs for receiving the binary words to be combined, although a single input could be utilised with the binary words to be combined being applied consecutively.

Preferably the means for repeatedly applying the previously generated first and second offset combination words to first and second logic gates comprises a connection from the output of the first logic gate to the second inputs of the first and second logic gates, and a connection from the output of the second logic gate to the first inputs of the first and second logic gates. This is effectively a feedback system, with the combination word generated at the output of each logic gate being fed back to an input of both logic gates.

Alternatively however a feed forward system can be employed in which the means for repeatedly applying the previously generated first and second offset combination words to first and second logic gates comprises N first and second optical logic gate pairs, each first and second optical logic gate pair comprising a first optical logic gate which generates a first combination word representing a first logical combination of binary words applied thereto, a second optical logic gate which generates a second combination word representing a second logical combination of binary words applied thereto, and offsetting means for offsetting the first and second combination words by one bit slot with respect to each other to generate first and second offset combination words, wherein the offsetting means is coupled to the downstream first and second optical logic gate pair such that the generated first and second offset combination words are applied to the first and second logic gates of the downstream first and second optical logic gate pair.

In the feedback system the offsetting means typically comprises an L bit slot delay line coupled to the output of the first optical logic gate and either an L+1 or an L−1 bit slot delay line coupled to the output of the second optical logic gate. Whilst any suitable method of introducing a one bit slot delay may be used, it is very difficult to introduce single bit slot delays at high bit rates. Accordingly, it is preferable to use L and either L+1 or L−1 bit delays allowing a one bit slot offset to be generated between the relevant optical binary words. Furthermore by using L and L+1 and L−1 bit slot delays, the output combination words can subsequently be fed back to the inputs of the logic gates without interfering with the previously input words.

The use of the L+1 or L−1 bit slot delay will depend on the format of the optical binary words. Thus if the first bit slot of the optical binary word represents the least significant bit of the binary numbers to be added, then the L+1 bit slot delay is used. On the other hand, if the first bit slot represents the most significant bit then the L−1 bit slot delay is used.

For ease of discussion the remainder of the specification will discuss examples in which the first bit slot represents the least significant bit of the binary numbers to be added, unless otherwise stated. Accordingly, the use of the L+1 bit slot delay will be assumed, although it will be appreciated that for a different optical binary word format the L−1 bit slot delay would be used.

Typically, in the feedback system, the connection from the first logic gate to the second inputs of the first and second logic gates comprises the L bit slot delay line, and wherein the connection from the output of the second logic gate to the first inputs of the first and second logic gates comprises either the L+1 or the L−1 bit slot delay line, although additional connections may be employed.

Preferably the feedback apparatus further comprises an optical combiner, the optical combiner having a first combiner input coupled to the L+1 bit slot delay line, a second combiner input which receives the first and second optical binary words, and a combiner output coupled to the first inputs of the first and second logic gates.

Whilst the optical combiner is not required for calculating the sum of two optical binary words, the presence of the combiner does not effect the operation of the circuit. Furthermore, as will be explained below, it is sometimes desirable to input more than two optical words to the circuit. In this case, the combiner is provided to prevent interferometric mixing of the optical word supplied to the circuit with the optical pulses already present in the circuit.

The optical combiner operates by combining bit slots received at the first and second inputs such that if the bit slots have identical logical states, the combiner output generates a bit slot having the first logical state and if the bit slots have different logical states, the combiner output generates a bit slot having the second logical state. In use, this allows the first and second words to be supplied in sequence to the second combiner input such that the first and second words are supplied respectively to the first and second inputs of the first and second optical logic gates.

In the feedforward system, the offsetting means typically comprises an M bit slot delay line which couples the first logic gate to the second gate inputs of the downstream first and second logic gate pair, and an M+1 bit slot delay line which couples the second logic gate to the first gate inputs of the downstream first and second logic pair such that the transfer of the first combination word is delayed by one bit slot with respect to the transfer of the second combination word. Whilst any suitable method of introducing a one bit slot delay may be used, it is very difficult to introduce single bit slot delays at high bit rates. Accordingly, it is preferable to use M and M+1 bit delays, for M>1, allowing a one bit slot offset to be generated between the relevant optical binary words.

Again, as described with respect to the feed forward system an M−1 bit slot delay line could be used instead of the M+1 bit slot delay line if the format of the optical binary words has the most significant bit in the first bit slot.

Preferably, the Nth first and second logic gate pair comprises feedback apparatus with the M bit slot delay line of the Nth first and second optical logic gate pair being constituted by the L bit slot delay line and the M+1 bit slot delay line of the Nth first and second optical logic gate pair being constituted by the L+1 bit slot delay line. Such an arrangement combines the advantages of both the feedback and the feedforward aspects of the present invention.

Preferably, each first logic gate comprises an XOR gate and wherein each second logic gate comprises an AND gate. It will be realized however that the invention could be implemented using complementary logic, in which case alternative logic gates, such as XNOR and NAND gates, would be used.

Typically each optical AND gate comprises an all optical non-linear gate, wherein the application of a bit slot having the second logical state to the first input selectively switches a connection between the second input and the output for a time interval corresponding to a single bit slot so as to transfer a single bit slot from the second input to the output, whereby a bit slot is generated at the output representing the logical AND of the bit slots received by the first and second inputs. This provides a simple means for combining optical words to generate the logical AND of the two words.

Typically each optical XOR gate comprises an optical combiner, the optical combiner comprising a first combiner input coupled to the first input of the XOR gate; a second combiner input coupled to the second input of the XOR gate; and, a combiner output, wherein if the bit slots received at the first and second combiner inputs have identical logical states, a bit slot having the first logical state is generated at the combiner output and wherein if the bit slots received at the first and second inputs have different logical states, a bit slot having the second logical state is generated at the combiner output. This apparatus provides a simple way of generating the logical XOR of first and second binary words.

Typically the XOR gate further comprises a source which generates a stream of bit slots having the second logical state and, an all-optical non-linear gate, the non-linear gate comprising a gate input coupled to the source, a gate output coupled to the XOR gate output and, a gate switching input coupled to the optical combiner output, wherein the application of a bit slot having the second logical state to the gate switching input selectively switches a connection between the gate input and the gate output, for a time interval corresponding to a single bit slot, so as to transfer a single bit slot from the gate input to the gate output. This ensures the optical quality of the optical word representing the logical XOR of the combined words is of good quality and is in the correct format for use by the rest of the circuit.

Typically the second logical state is defined by a bit slot containing a single optical pulse, although this depends on the specific implementation of the circuit and it is therefore evident that a bit slot containing a single optical pulse may define the first logical state.

Typically the first combination word represents the binary sum when each bit slot of the second binary word has the first logical state, although again this depends on the specific implementation of the circuit.

According to a third aspect of the present invention, we provide a method of counting a number of binary words, each binary word having L bit slots, the first or the Lth bit slot having a second logical state, the remaining L−1 bit slots having a first logical state, the method comprising the steps of:

1) generating a first combination word representing a first logical combination of first and third combination binary words;

2) generating a second combination word representing a second logical combination of first and third combination binary words;

3) generating first and second offset combination words by offsetting the first combination word by one bit slot with respect to the second combination word;

4) generating the third combination word by combining the offset second combination word with a further binary word;

5) continuously repeating steps 1), 2) 3) and 4) until the number of binary words have been combined and each bit slot of the second combination word has the same logical state, wherein each of the first and second offset combination words initially comprise one of the number of binary words, the count of the number of binary words being given by the first combination word when each bit slot of the second combination word has the same logical state.

Typically, in either method of the invention the first logical combination comprises an XOR combination and the second logical combination comprises an AND combination. It will be realized however that the methods could be implemented using complementary logic, in which case alternative logical combinations would be used.

Typically the methods are continuously repeated until each bit slot of the second combination word has the second logical state, although this will depend on the implementation of the methods.

Preferably, the second logical state is defined by a bit slot containing a single optical pulse, although a bit slot containing a single optical pulse may define the first logical state.

In the case when the first bit slot has the second logical state, then preferably the first and second offset combination words are generated by temporarily storing the first combination word for a time interval corresponding to M bit slots and temporarily storing the second combination word for a time interval corresponding M+1 bit slots. In contrast, if the Lth bit slot has the second logical state, then preferably the second combination word is stored for a time interval corresponding to M−1 bit slots. As explained above with respect to the feed forward system, the use of the M bit slot and either the M+1 or M−1 bit slot delays overcomes the problems associated with introducing single bit slot delays at high bit rates.

The method according to the second aspect of the invention is preferably carried out utilizing apparatus according to the first aspect of the invention.

Typically, the method according to the third aspect of the invention may be carried out utilizing apparatus according to the first aspect of the invention when the apparatus further comprises the optical combiner, as mentioned above.

BRIEF DESCRIPTION OF THE DRAWINGS

Examples of the present invention will now be described with reference to the accompanying drawings, in which.

DETAILED DESCRIPTION OF EXEMPLARY EMBODIMENTS OF THE INVENTION

In order that the invention be understood, certain symbols have been used in the Figures relating to the description. These symbols are shown in FIGS. 1a to 1d and their meanings will now be discussed.

Figure 1A:
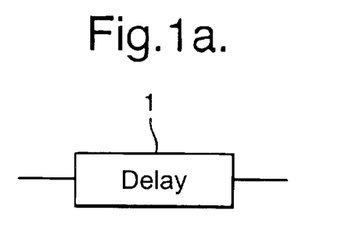
FIG. 1a shows a schematic representation of a delay line.

FIG. 1a shows a delay line 1 which operates to delay the transfer of an optical pulse stream applied at one end of the delay line 1 to the other end, by a predetermined time interval. This time interval usually corresponds to a predetermined number of bit slots. The delay is achieved using either a length of optical fibre, a silica plane waveguide, or a free space path, or the like, such that the optical pulse takes a predetermined amount of time to travel the length of the element.

The length of delay on a delay line will depend upon the physical length of the waveguide, free space path, or optical fibre used and also the refractive index of the particular transmission media (which will effect the speed of light within the media).

Figure 1B:
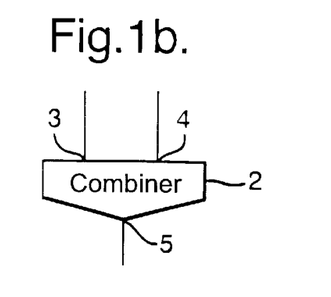
FIG. 1b shows a schematic representation of an optical combiner.

FIG. 1b shows an all optical combiner 2 which has two combiner inputs 3, 4 and a combiner output 5. The combiner 2 combines two optical pulse streams applied to the two combiner inputs 3, 4 in a way that avoids interferometric mixing of pulses.

In practice this is usually achieved by having the pulses of the two different pulse streams arranged at different positions within the respective bit slots, such that the pulses do not overlap in time but are still in the same bit slot. Alternatively however it can be achieved by having orthogonally polarised optical combiner inputs, with the received optical pulse streams having at least some components which will pass through the polarising elements.

As a result of this non-interferometric mixing of pulses, the total optical energy output from the optical combiner during any one bit slot is sum of the total optical energy received.

The optical combiner will usually take the form of an optical fibre coupler, a silica planar waveguide, or a bulk beam splitter.

Figure 1C:
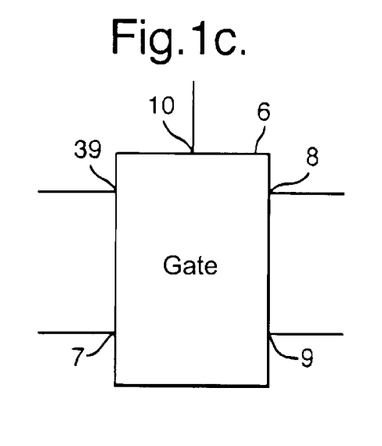
FIG. 1c shows a schematic representation of an all optical non-linear gate.

FIG. 1c shows an all optical non-linear gate 6 which is a form of non-linear optical switching element such as a fibre non-linear optical loop mirror (NOLM), a fibre NOLM with an offset semiconductor amplifier, or an integrated planar NOLM. Mach-Zenuer, Michaelson and time-division versions of these devices are also possible although will not be considered in detail in the specification. One specific type of optical switching element of this type is the terahertz optical asymmetric demultiplexers (TOADS), which are described in the paper entitled "Asymmetrical Optical Loop Mirror: analysis of an all-optical switch", Applied Optics, Volume 3, No. 29 1994.

The all optical gate has two gate inputs 7, 39, two gate outputs 8, 9 and a gate switching input 10. Each gate input 7, 39 is connected internally to a respective gate output 8, 9, with the connections depending on the state of the switch. Thus, when the gate is in an unswitched state, the gate input 7 is connected to the gate output 9 and gate input 39 is connected to gate output 8. However, when the gate is in a switched state, the gate input 7 is connected to the gate output 8 and the gate input 39 is connected to the gate output 9.

In operation, the state of the switch is controlled by the application of optical pulses to the gate switching input 10. This is achieved using an optical pulse stream comprising a number of bit slots, the stream containing a number of optical pulses. These optical pulses are received by the gate which operates to integrate the total optical energy received over a predetermined time period. From now on, it will be assumed that this time period corresponds to a single bit slot, although in certain circumstances, longer or shorter time periods may be preferable.

Thus, for example, if a single optical pulse has a total energy E, and a bit slot containing a single optical pulse was applied to the gate switching input 10, then a total energy E would be detected. However, if two optical pulses were present within a single bit slot, then the switching input would detect a total energy 2E equivalent to two optical pulses.

The gate has an approximately sinusoidal response to the total amount of energy received during the predetermined time period, such that if the total energy received is an odd integer multiple of the energy contained in one optical pulse, then the switch will enter the switched state so as to transfer any data received at one of the gate inputs 7, 39 to the respective gate output. The gate will return to the unswitched state at the start of the next bit slot. If an even integer multiple is received the switch will remain in the unswitched state.

There is however a limit to the number of optical pulses that can be detected during any one time period. Accordingly, to avoid miscalculation of the number of pulses received, it is preferably ensured that no more than two optical pulses will ever be received by the switch during a single bit slot. Consequently, the switch will only enter a switched state if a single optical pulse is received during the bit slot. Such a bit slot containing a single optical pulse for application to the gate switching input 10 is hereinafter referred to as a switching signal.

Thus, with none or two optical pulses applied to the gate switching input 10, during a bit slot, an optical pulse stream provided at the gate input 7 will pass through the all optical gate to the second gate output 9. However the application of a single optical pulse to the gate switching input 10 will act as a switching signal causing a single bit slot of the optical pulse stream applied to the gate input 7, to be diverted from the second gate output 9, to the first gate output 8. Any further bit slots in the input optical stream will continue to be output from the second gate output 9 unless further switching signals are received.

In logical terms, the gate 6 operates such that reception of a bit slot containing one optical pulse is equivalent to receiving a logical signal of one logical state, whilst reception of a bit slot containing no or two optical pulses is equivalent to receiving a logical signal of the complementary logical state.

It will be appreciated by a person skilled in the art that the gate outputs 8, 9 may be coupled to the switching input 10 of a second gate 6, to provide a wavelength translation, if required. In this case, the second gate 6 will use the optical pulses received from the respective output 8,9 of the first gate as switching inputs such that the output from the second gate 6 is effectively a regenerated copy of the output of the first gate 6. Such a setup is disclosed in the co-pending application WO98/44512.

Figure 1D:
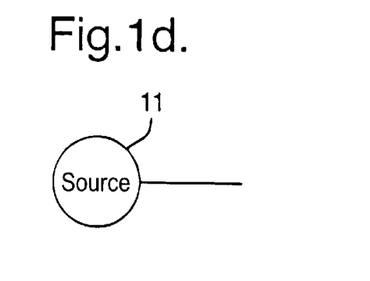
FIG. 1d shows a schematic representation of an optical pulse source.

FIG. 1*d* shows an optical pulse source 11, which usually takes the form of a semiconductor laser producing pulses at a wavelength of approximately 1.5 micrometers. The pulse repetition rate is approximately 1 GHz with the laser providing 10 ps pulses after linear chirp compensation in a length of non-dispersive optical fibre, although pulse repetition rates of over 100 GHz are possible. Such a pulse source 11 will generally be configured to produce one of two optical pulse sequences. The first configuration, which will hereinafter be called a pulse stream generator generates an optical pulse stream with an optical pulse in every bit slot. The second configuration, which will hereinafter be called a sync pulse generator, generates an optical pulse stream with an optical pulse in one bit slot only.

Figure 2:
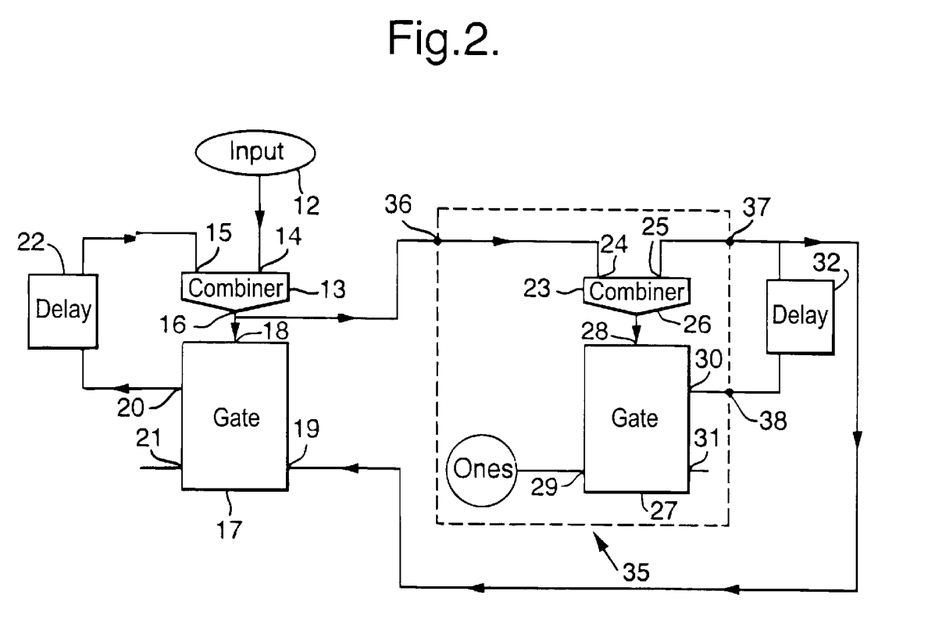
FIG. 2 shows a schematic representation of a binary adder according to the present invention.
Figure 4:
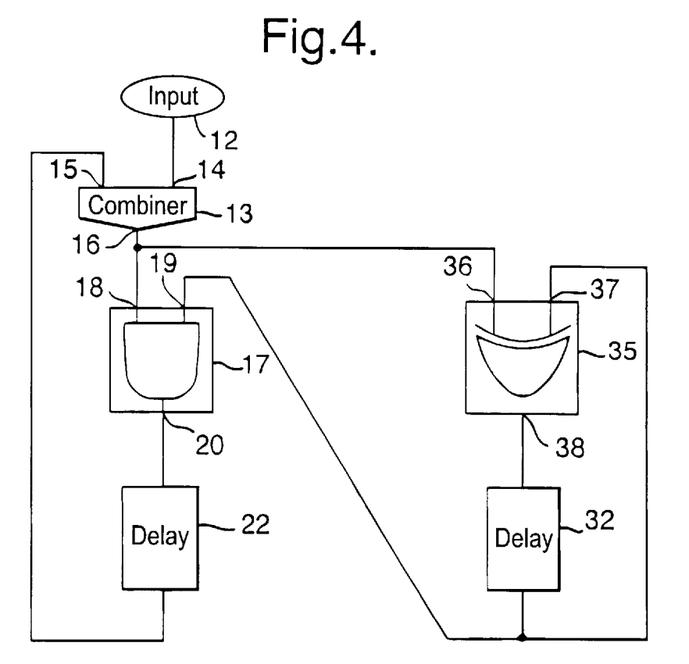
FIG. 4 shows a schematic representation of the configuration of the logic gates used in the binary adder of FIG. 2.

An example of a binary adder according to the present invention is shown in FIGS. 2 and 4, with FIG. 2 showing schematically the configuration of the components of the binary adder and FIG. 4 showing schematically the configuration of the logic gates of FIG. 2. As shown, the adder comprises an input 12 which supplies an optical pulse stream comprising two or more optical binary words in sequence, each binary word being of L bit slots in length, to the adder circuit.

The input 12 is coupled to the first combiner input 14 of an optical combiner 13, which has a combiner output 16 coupled to a gate switching input 18 of an optical gate 17. The gate 17 acts as an AND gate to generate, at its first gate output 20, the logical AND of optical pulse streams received at the gate switching input 18 and the gate input 19. In these circumstances, the gate inputs can be considered as a first AND gate input 18 and a second AND gate input 19, whilst the first gate output 20 is an AND gate output 20. The second gate output 21 is unused in this configuration.

The AND gate output 20 is coupled via an optical delay line 22 to the second combiner input 15 of the combiner 13. Optical pulses traveling along the delay line 22 will be delayed by L+1 bit slots.

The combiner output 16 is also coupled to a first XOR gate input 36 of an optical XOR gate 35. The XOR gate 35 comprises an optical combiner 23, an optical non-linear gate 27 and a pulse stream generator 33 which generates a stream of optical pulses.

The first combiner input 24 of the combiner 23 is connected to the combiner output 16 via the first XOR gate input 36. The combiner output 26 is coupled to the gate switching input 28 of the gate 27, whose gate input 29 is coupled to the pulse stream generator 33 so as to receive the stream of optical pulses.

The second gate output 31 is unconnected, whilst the first gate output 30 is coupled via an XOR gate output 38 to a delay line 32, which introduces a delay, for optical pulses traveling along its length, of a time interval equivalent to L bit slots.

The use of an L bit slot delay and an L+1 bit slot delay allows the optical words output from the XOR gate and the AND gate to be offset by one bit slot with respect to each other. It is preferable to obtain a one bit slot offset in this manner, as opposed to using alternative circuit configurations such as a single one bit slot delay, as one bit slot delays are difficult to achieve at high bit rates.

The delay line 32 is connected, via a second XOR gate input 37, to the combiner input 25 and also to the second AND gate input 19 of the optical AND gate 17.

As mentioned above, the optical gate 27, the pulse stream generator 33 and the optical combiner 23 in combination form an exclusive OR gate, as shown in FIG. 4, which operates as follows.

The optical combiner 23 combines any optical pulses received at the combiner inputs 24, 25 such that if only a single optical pulse is received at either input 24, 25 during any one bit slot, then the output from the combiner will be a single optical pulse. This optical pulse then acts as a switching signal causing the gate 27 to enter the switched state, which results in a single optical pulse being transferred from the gate input 29 to the first gate output 30.

However, if a single optical pulse is received at both the combiner inputs 24, 25, then the optical combiner 23 will output two optical pulses in the same bit slot. As mentioned above, the gate switching input 22 detects a total energy equivalent to two optical pulses, which does not act as a switching signal. Accordingly, the gate remains in an unswitched state and the stream of optical pulses from the pulse stream generator 33 will be transferred to the second gate output 31. The gate also remains in the unswitched state if no optical pulses are received by the optical combiner 23, during the respective bit slot.

Thus, the XOR gate 35 generates, at the XOR gate output 38, the XOR of the optical pulses received at the XOR gate inputs 36, 37. An optical pulse is output from the XOR gate output 30 when a signal optical pulse only is received, during a bit slot, by one of the two XOR gate inputs 36, 37. If none or two optical pulses are received then no optical pulse is output.

In fact, with the delay line 32 added to feed back the output from the XOR gate output 38 to the second XOR gate input 37, then an XOR gate is formed which will generate the XOR of two L bit slot words supplied consecutively to the XOR gate input 36.

Operation of the binary adder will now be described.

Figure 3:
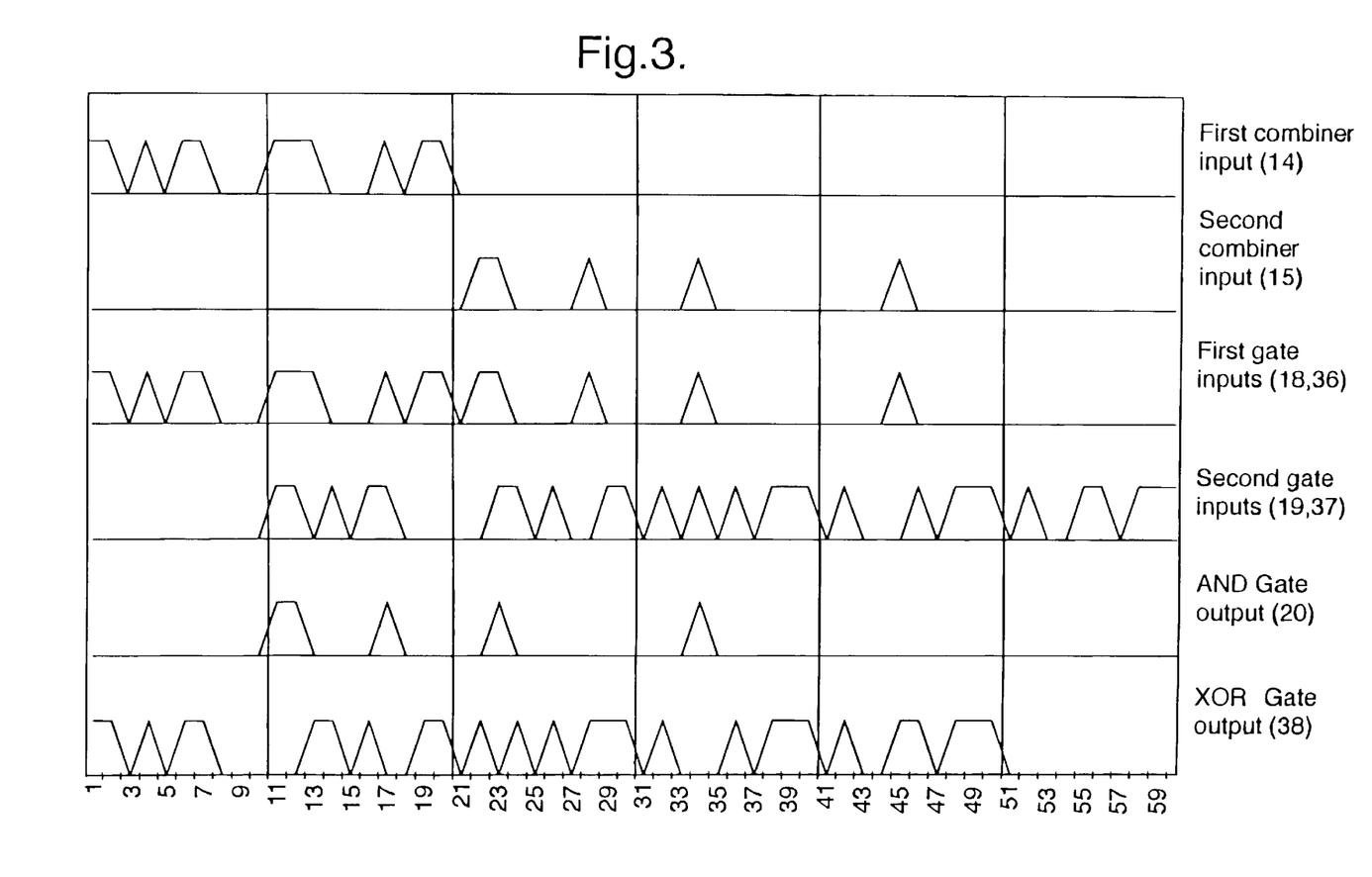
FIG. 3 shows bit slot time lines indicating the presence of optical pulses at several locations around the binary adder of FIG. 2.

The first example to be described with reference to Table 1 and FIG. 3 is the simple binary addition of two binary words, each of L bit slots in length, where L=10.

In this case the binary numbers to be added are "0001101011" and "1101000111", which gives a result of "1110110010".

TABLE 1

| Bit Slot | First Combiner Input (14) | Second Combiner Input (15) | First Gate Inputs (18 & 36) | Second Gate Inputs (19 & 37) | AND Gate Output (20) | XOR Gate Output (38) |
|---|---|---|---|---|---|---|
| 1 | 1 | 0 | 1 | 0 | 0 | 1 |
| 2 | 1 | 0 | 1 | 0 | 0 | 1 |
| 3 | 0 | 0 | 0 | 0 | 0 | 0 |
| 4 | 1 | 0 | 1 | 0 | 0 | 1 |
| 5 | 0 | 0 | 0 | 0 | 0 | 0 |
| 6 | 1 | 0 | 1 | 0 | 0 | 1 |
| 7 | 1 | 0 | 1 | 0 | 0 | 1 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 1 | 0 | 1 | 1 | 1 | 0 |
| 12 | 1 | 0 | 1 | 1 | 1 | 0 |
| 13 | 1 | 0 | 1 | 0 | 0 | 1 |
| 14 | 0 | 0 | 0 | 1 | 0 | 1 |
| 15 | 0 | 0 | 0 | 0 | 0 | 0 |
| 16 | 0 | 0 | 0 | 1 | 0 | 1 |
| 17 | 1 | 0 | 1 | 1 | 1 | 0 |
| 18 | 0 | 0 | 0 | 0 | 0 | 0 |
| 19 | 1 | 0 | 1 | 0 | 0 | 1 |
| 20 | 1 | 0 | 1 | 0 | 0 | 1 |
| 21 | 0 | 0 | 0 | 0 | 0 | 0 |
| 22 | 0 | 1 | 1 | 0 | 0 | 1 |
| 23 | 0 | 1 | 1 | 1 | 1 | 0 |
| 24 | 0 | 0 | 0 | 1 | 0 | 1 |
| 25 | 0 | 0 | 0 | 0 | 0 | 0 |
| 26 | 0 | 0 | 0 | 1 | 0 | 1 |
| 27 | 0 | 0 | 0 | 0 | 0 | 0 |
| 28 | 0 | 1 | 1 | 0 | 0 | 1 |
| 29 | 0 | 0 | 0 | 1 | 0 | 1 |
| 30 | 0 | 0 | 0 | 1 | 0 | 1 |
| 31 | 0 | 0 | 0 | 0 | 0 | 0 |
| 32 | 0 | 0 | 0 | 1 | 0 | 1 |
| 33 | 0 | 0 | 0 | 0 | 0 | 0 |
| 34 | 0 | 1 | 1 | 1 | 1 | 0 |
| 35 | 0 | 0 | 0 | 0 | 0 | 0 |
| 36 | 0 | 0 | 0 | 1 | 0 | 1 |
| 37 | 0 | 0 | 0 | 0 | 0 | 0 |
| 38 | 0 | 0 | 0 | 1 | 0 | 1 |
| 39 | 0 | 0 | 0 | 1 | 0 | 1 |
| 40 | 0 | 0 | 0 | 1 | 0 | 1 |
| 41 | 0 | 0 | 0 | 0 | 0 | 0 |
| 42 | 0 | 0 | 0 | 1 | 0 | 1 |
| 43 | 0 | 0 | 0 | 0 | 0 | 0 |
| 44 | 0 | 0 | 0 | 0 | 0 | 0 |
| 45 | 0 | 1 | 1 | 0 | 0 | 1 |
| 46 | 0 | 0 | 0 | 1 | 0 | 1 |
| 47 | 0 | 0 | 0 | 0 | 0 | 0 |
| 48 | 0 | 0 | 0 | 1 | 0 | 1 |
| 49 | 0 | 0 | 0 | 1 | 0 | 1 |
| 50 | 0 | 0 | 0 | 1 | 0 | 1 |
| 51 | 0 | 0 | 0 | 0 | 0 | 0 |
| 52 | 0 | 0 | 0 | 1 | 0 | 1 |
| 53 | 0 | 0 | 0 | 0 | 0 | 0 |
| 54 | 0 | 0 | 0 | 0 | 0 | 0 |
| 55 | 0 | 0 | 0 | 1 | 0 | 1 |
| 56 | 0 | 0 | 0 | 1 | 0 | 1 |
| 57 | 0 | 0 | 0 | 0 | 0 | 0 |
| 58 | 0 | 0 | 0 | 1 | 0 | 1 |
| 59 | 0 | 0 | 0 | 1 | 0 | 1 |
| 60 | 0 | 0 | 0 | 1 | 0 | 1 |

The first binary word is transferred from the input 12 to the first input 14 of the optical combiner 13, during bit slots 1–10. Initially there are no other optical pulses present in the circuit. Consequently, the first word is transferred via the combiner 13 to the AND gate 17, which generates an output containing no optical pulses at the AND gate output 20, as shown in FIG. 3 and Table 1.

The first word is also transferred to the XOR gate 35, which generates a copy of the word at the XOR gate output 38. This is transferred to the delay line 32, which introduces a time delay equivalent to L bit slots (i.e. 10 bit slots), such that the word is transferred to the second AND gate input 19 and the second XOR gate input 37 during bit slots 11–20.

Simultaneously, during bit slots 11–20, the second binary word is transferred to the first combiner input 14. Again, with no optical pulses present at the second combiner input 15, the second binary word is simply transferred to the first AND gate input 18 and the first XOR gate input 36, as shown in Table 1 and FIG. 3.

The XOR gate 35 generates at the output 38 an optical XOR word representing the logical XOR combination of the first and second words. This is transferred to the delay line 32 and, after being delayed by a time interval of L bit slots (i.e. 10 bit slots), the optical XOR word is transferred to the second AND gate input 19 and the second XOR gate input 37, during bit slots 21–30.

The AND gate 17 generates at the AND gate output 20 an optical AND word representing the logical AND combination of the first and second words. This is transferred to the delay line 22 and, after being delayed by a time interval of L+1 bit slots (i.e. 11 bit slots), the optical AND word is transferred to the second combiner input, during bit slots 22–31. With no further binary words being transferred from the input 12, the optical AND word is transferred to the first AND gate input 20 and the first XOR gate input 36, during bit slots 22–31.

Thus during bit slots 21–30, the XOR gate 35 and the AND gate 17 receive the optical XOR word generated during bit slots 11–20 and, by virtue of the optical AND word being delayed by an additional bit slot, the optical AND word generated in bit slots 10–19. From these optical words, further AND and XOR optical words are generated and output from the AND and XOR gate outputs 38, 20, respectively.

These further optical words are again delayed by the respective delay lines 32, 22 and returned to the first and second AND and XOR gate inputs 18, 19, 36, 37.

This process is repeated until there are no optical pulses present in the output from the AND gate 35, for an entire L bit slot duration, i.e. during bit slots 41–50, as shown in FIG. 3 and Table 1. At this time the optical XOR word output from the XOR gate output 38 represents the binary sum of the first and second words.

A second example of the present invention of a binary adder is shown in Table 2. Again the binary numbers to be added are "00011010011" and "1101000111". However, in this example the most significant bit if represented by the first bit slot of the optical binary words. Accordingly, the delay line 22 of FIG. 1 would be replaced by an L−1 bit slot delay line. Again the output obtained in bit slots 41–50 represents the binary sum "1110110010".

Table 2 is therefore to be interpreted in a similar manner to Table 1 except that the optical AND word output from the AND gate output 20 is delayed by a time interval corresponding to L−1 bit slots (i.e. 9 bit slots), as opposed to L+1 bit slots, before being transferred to the second combiner input.

TABLE 2

| Bit Slot | First Combiner Input (14) | Second Combiner Input (15) | First Gate Inputs (18 & 36) | Second Gate Inputs (19 & 37) | AND Gate Output (20) | XOR Gate Output (38) |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 1 | 0 | 1 | 0 | 0 | 1 |
| 5 | 1 | 0 | 1 | 0 | 0 | 1 |
| 6 | 0 | 0 | 0 | 0 | 0 | 0 |
| 7 | 1 | 0 | 1 | 0 | 0 | 1 |
| 8 | 0 | 0 | 0 | 0 | 0 | 0 |
| 9 | 1 | 0 | 1 | 0 | 0 | 1 |
| 10 | 1 | 0 | 1 | 0 | 0 | 1 |
| 11 | 1 | 0 | 1 | 0 | 0 | 1 |
| 12 | 1 | 0 | 1 | 0 | 0 | 1 |
| 13 | 0 | 0 | 0 | 0 | 0 | 0 |
| 14 | 1 | 0 | 1 | 1 | 1 | 0 |
| 15 | 0 | 0 | 0 | 1 | 0 | 1 |
| 16 | 0 | 0 | 0 | 0 | 0 | 0 |
| 17 | 0 | 0 | 0 | 1 | 0 | 1 |
| 18 | 1 | 0 | 1 | 0 | 0 | 1 |
| 19 | 1 | 0 | 1 | 1 | 1 | 0 |
| 20 | 1 | 0 | 1 | 1 | 1 | 0 |
| 21 | 0 | 0 | 0 | 1 | 0 | 1 |
| 22 | 0 | 0 | 0 | 1 | 0 | 1 |
| 23 | 0 | 1 | 1 | 0 | 0 | 1 |
| 24 | 0 | 0 | 0 | 0 | 0 | 0 |
| 25 | 0 | 0 | 0 | 1 | 0 | 1 |
| 26 | 0 | 0 | 0 | 0 | 0 | 0 |

TABLE 2-continued

| Bit Slot | First Combiner Input (14) | Second Combiner Input (15) | First Gate Inputs (18 & 36) | Second Gate Inputs (19 & 37) | AND Gate Output (20) | XOR Gate Output (38) |
|---|---|---|---|---|---|---|
| 27 | 0 | 0 | 0 | 1 | 0 | 1 |
| 28 | 0 | 1 | 1 | 1 | 1 | 0 |
| 29 | 0 | 1 | 1 | 0 | 0 | 1 |
| 30 | 0 | 0 | 0 | 0 | 0 | 0 |
| 31 | 0 | 0 | 0 | 1 | 0 | 1 |
| 32 | 0 | 0 | 0 | 1 | 0 | 1 |
| 33 | 0 | 0 | 0 | 1 | 0 | 1 |
| 34 | 0 | 0 | 0 | 0 | 0 | 0 |
| 35 | 0 | 0 | 0 | 1 | 0 | 1 |
| 36 | 0 | 0 | 0 | 0 | 0 | 0 |
| 37 | 0 | 1 | 1 | 1 | 1 | 0 |
| 38 | 0 | 0 | 0 | 0 | 0 | 0 |
| 39 | 0 | 0 | 0 | 1 | 0 | 1 |
| 40 | 0 | 0 | 0 | 0 | 0 | 0 |
| 41 | 0 | 0 | 0 | 1 | 0 | 1 |
| 42 | 0 | 0 | 0 | 1 | 0 | 1 |
| 43 | 0 | 0 | 0 | 1 | 0 | 1 |
| 44 | 0 | 0 | 0 | 0 | 0 | 0 |
| 45 | 0 | 0 | 0 | 1 | 0 | 1 |
| 46 | 0 | 1 | 1 | 0 | 0 | 1 |
| 47 | 0 | 0 | 0 | 0 | 0 | 0 |
| 48 | 0 | 0 | 0 | 0 | 0 | 0 |
| 49 | 0 | 0 | 0 | 1 | 0 | 1 |
| 50 | 0 | 0 | 0 | 0 | 0 | 0 |
| 51 | 0 | 0 | 0 | 1 | 0 | 1 |
| 52 | 0 | 0 | 0 | 1 | 0 | 1 |
| 53 | 0 | 0 | 0 | 1 | 0 | 1 |
| 54 | 0 | 0 | 0 | 0 | 0 | 0 |
| 55 | 0 | 0 | 0 | 1 | 0 | 1 |
| 56 | 0 | 0 | 0 | 1 | 0 | 1 |
| 57 | 0 | 0 | 0 | 0 | 0 | 0 |
| 58 | 0 | 0 | 0 | 0 | 0 | 0 |
| 59 | 0 | 0 | 0 | 1 | 0 | 1 |
| 60 | 0 | 0 | 0 | 0 | 0 | 0 |

As shown in FIG. 3, the optical word representing the binary sum is repeatedly output from the XOR gate output until the circuit is reset. This occurs as a result of the optical pulses forming the output from the XOR gate output 38 being fed back to the second XOR gate input 37. With no additional optical pulses present elsewhere in the circuit, any pulses fed back to the second XOR gate input 37 will be regenerated by the XOR gate 35 and again output. Accordingly, reset of the circuit is achieved by resetting the XOR gate 35.

In order to reset the XOR gate it is necessary to ensure that no optical pulses are transferred from gate input 29 to the first gate output 30 upon reception of a switching signal at the gate switching input 28. This condition must be maintained for at least L bit slots in order to reset every bit slot of an L bit slot optical word.

This can be achieved by replacing the stream of optical pulses received from the pulse stream generator 33, by a stream of optical bit slots containing an optical bit slot window of R optical bit slots, each of the R bit slots containing no optical pulses. Accordingly, upon reception of a switching signal by the gate switching unit 28 of the gate 27, the respective empty bit slot contained in the R bit slot window is transferred to the first gate output 30 to the XOR gate output 38. To ensure all the bit slots of the word are reset. R must be greater than or equal to L.

Such an R bit slot window containing no optical pulses can be obtained from a window generator described in our co-pending application GB9719895.6, and which will now be described with reference to FIGS. 5 and 6.

Figure 5:
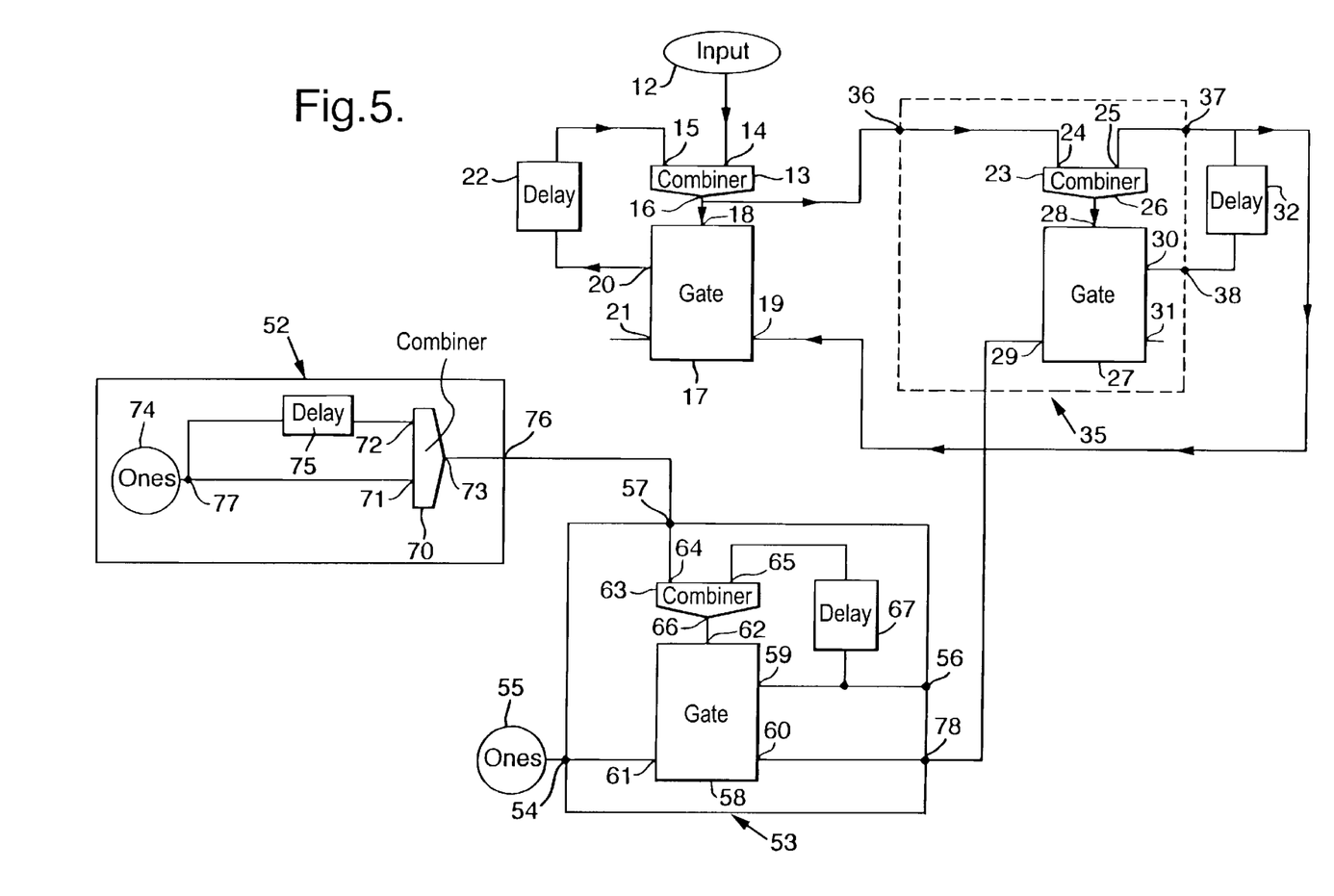
FIG. 5 shows a resettable binary adder, which includes the binary adder of FIG. 2 coupled to a window generator.

FIG. 5 shows a resettable binary adder, which includes the binary adder of FIG. 2 coupled to a window generator which comprises a pulse pair generator 52 and a switching device 53.

The switching device 53 has an input port 54, to which is coupled an pulse stream generator 55, two output ports 56,38 and a switching input port 57 which is coupled to the generator output 76 of the pulse pair generator 52.

The switching device itself consists of an all optical non-linear gate 58 the first gate output 59 of which is coupled to the second combiner input 65 of an optical combiner 63, via a feedback loop. The feedback loop is formed from a delay line 67, which, for the purposes of the window generator, introduces a time delay equivalent to a single bit slot. Accordingly, an optical pulse transferred through the delay line 67 will arrive at the second combiner input 65 of the optical combiner 63 in the bit slot immediately following the bit slot it would have arrived in if it had been traveling through a non-delaying connection.

The gate input 61, is coupled to the switching device input port 54 to receive the optical pulse stream generated by the pulse stream generator 55, whilst the gate switching input 62 is coupled to the combiner output 66 of the optical combiner 63. The first combiner input 64 is connected to the switching device switching input port 57, to receive optical pulses from the pulse pair generator 52.

The pulse pair generator 52 consists of an all optical combiner 70. Connected to a first combiner input 71 of the optical combiner 70 is a sync pulse generator 74, whilst connected to the second input 72 is a delay line 75. The delay line 75, which is also coupled to the sync pulse generator 74, operates to add a time delay equal to a number of bit slots R. The combiner output 73 of the combiner 70, is connected via an output port 76 of the pulse pair generator 52 to the switching input port 57 of the switching device 53.

Operation of the window generator of FIG. 5 will now be described with reference to FIG. 6 which shows bit slot time lines for several locations around the window generator circuit. Each time line, which is split into a series of bit slots, shows the presence of optical pulses at the respective points in the circuit. A stream of pulses is represented by the continuous presence of a pulse although it could equally be shown as a series of discrete pulses.

As described above, the switching device 53 is coupled to the pulse stream generator 55 which supplies the optical pulse stream to the input port 54 of the switching device and hence to the gate input 61 of the gate 58.

Initially, with no optical pulse applied to the switching input port 57 of the switching device, there will be no optical pulse input to the gate switching input 62 of the gate 58. Accordingly, the stream of optical pulses supplied to the gate input 61 will pass through the all optical gate 58 to the gate output 60. As a result, no optical pulses are output from the gate output 59 and a stream of pulses are output from the second gate output 60.

Figure 6:
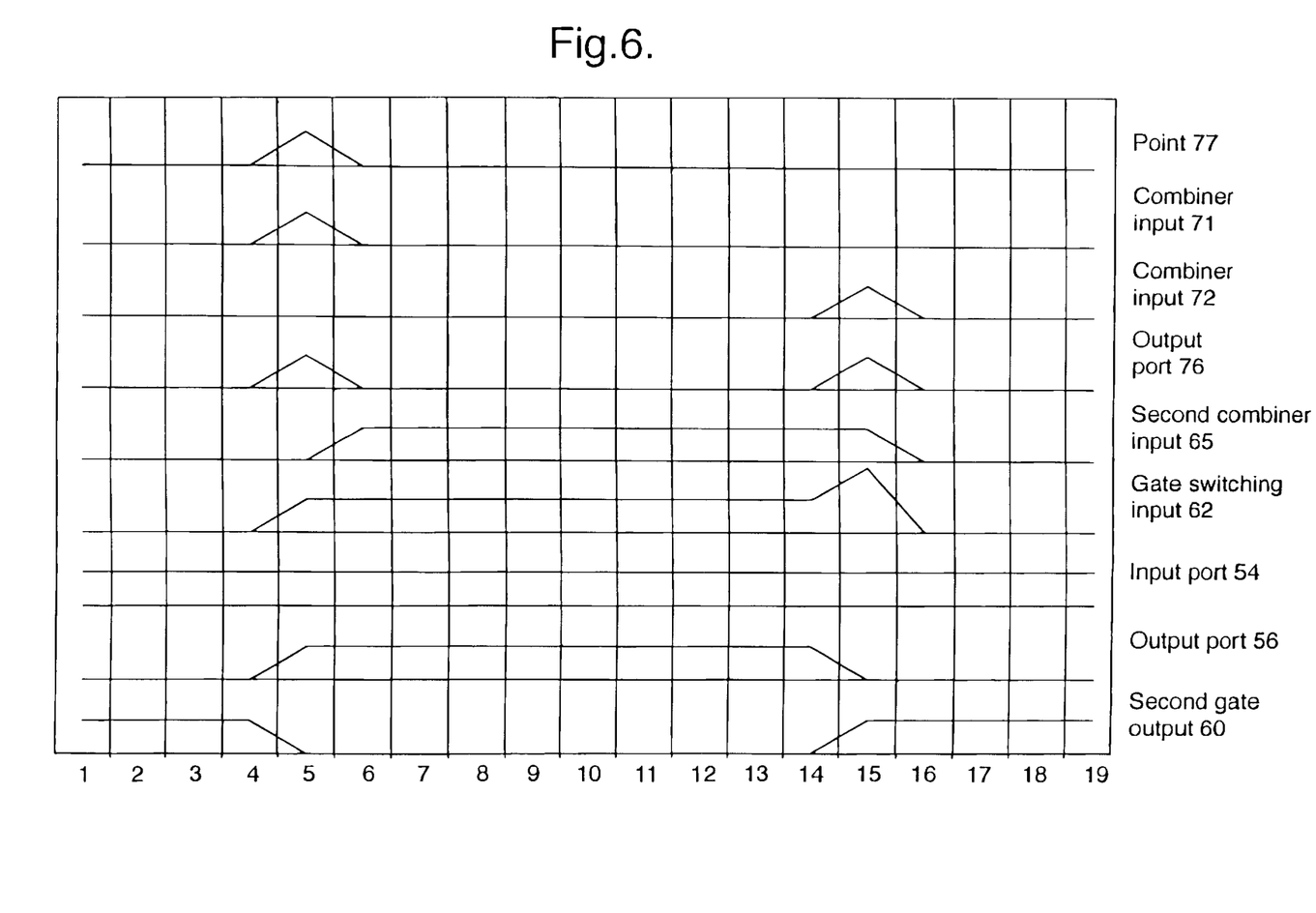
FIG. 6 shows bit slot time lines indicating the presence of optical pulses at several locations around the window generator shown in FIG. 5.

In bit slot 5, as labeled on FIG. 6, the single optical pulse is output from the sync pulse generator 74 and transferred to the optical combiner 70. As shown in FIG. 6, the single optical pulse arrives at a point 77 and is split into two copies, one of which is transferred directly to the first combiner input 71 of the all optical combiner 70, whilst the other is transferred to the second combiner input 72, via the delay line 75. The pulse traveling along the delay line 75 will be delayed by R bit slots (in the present example R=10) with respect to the pulse traveling directly to the optical combiner 70. As a consequence, the optical combiner 70 will receive one optical pulse at the combiner input 71 in the bit slot 5 and a second optical pulse at combiner input 72 in bit slot 15, as shown in FIG. 6.

These optical pulses are then combined to form a single optical pulse stream including two optical pulses separated by k bit slots, which is transferred to the switching input port 57 of the switching device 53.

When the first pulse is received from the pulse pair generator 52, it will be input to the switching input port 57 of the switching device and hence to the first combiner input 64 of the optical combiner 63, as shown. This optical pulse is then transferred to the gate switching input 62 of the gate 58 to act as a switching signal. This will cause a first optical pulse to be switched from the gate input 61 to the gate output 59 during bit slot 5.

This optical pulse is fed back via the delay line 67 to the second combiner input 65 of the optical combiner 63. Because the delay line 67 introduces a single bit delay into the feedback loop, the fed back optical pulse will arrive back at the gate switching input 62 in bit slot 6, as the subsequent optical pulse output from the pulse stream generator 55 is received at the gate input 61. Accordingly the first optical pulse output from the gate output 59 will act as a switching signal, in bit slot 6, causing the next optical pulse to be switched from the gate input 61 to the gate output 59. This is repeated for bit slots 6 to 14, causing a stream of 50 optical pulses to be output from the gate output 59.

This continues until the second pulse is output from the pulse pair generator 52, in bit slot 15. This pulse will arrive at the first combiner input 64 of the optical combiner 63 in bit slot 55, the same time as an optical pulse from the feedback loop is received at the second combiner input 65.

With both pulses arriving at the all optical combiner 63 simultaneously, two optical pulses will be output in the same bit slot. Accordingly, the gate switching input 62 will detect a total energy equivalent to two optical pulses. This does not act a switching signal and as a result, the stream of optical pulses from the pulse stream generator 55 will no longer be switched to the gate output 59.

Consequently, when placed in combination, the optical combiner 63 and the gate 58 function as an XOR system, with the gate 58 only entering the switched state when only one optical pulse is received at one of the optical combiner inputs 64, 65. When no pulse is received, or a pulse is received at both inputs, simultaneously during the same bit slot period, then the signal output from the combiner will not act as a switching signal, causing the gate to remain in an unswitched state.

Thus by providing an optical signal stream from the pulse pair generator 52 with two pulses, the pulses being separated by a predetermined number of bit slots R, the window generator will output an optical signal stream consisting of K optical pulses, from the gate output 59.

Furthermore, as it is the delay line 75 that introduces the delay in the pulse pair generator 52, it is the length of the time delay of the delay line 75 that sets the number of bits R. Thus in the example of FIG. 6, the delay line 75 introduces a delay equivalent to 10 bit slots, causing the window generator to output a sequence of 50 optical pulses from the output port 56. However, the number of bit slots that the delay line 75 delays the optical pulse by could be altered, causing a corresponding change in the number of optical pulses output from the output port 56 of the switching device 53.

The second gate output 60 generates an optical signal stream that is the logical complement of the optical signal stream generated by the first gate output 59. The second output port 78 is therefore coupled to the gate output 60 so as to produce an optical signal stream including an R bit slot window, the R bit slots not having an optical pulse in, with any bit slots not inside the R bit window including an optical pulse.

In order for reset of the binary adder to occur, the output port 78 of the window generator is connected to the gate input 29 of the gate 27 of the XOR gate 35', which is similar to the XOR gate 35 of FIG. 2, lacking only the pulse stream generator 33.

The window generator then operates to generate a stream of optical bit slots containing optical pulses allowing the adder to be used as normal. Then, as reset of the adder is required the window generator generates an R optical bit slot window containing no optical bit slots, causing R of the optical bit slots of the output from the XOR gate 35' to be reset. Accordingly, for R>L, the adder is completely reset such that the circuit no longer contains any optical pulses.

The third example of operation of the binary adder of FIG. 2 will now be described with reference to Table 3 and FIG. 7. This is the operation of the circuit as a simple counting circuit.

In order to operate as a counter, the circuit must be supplied with a sequence of binary words, each word being of L bit slots in length and containing only single optical pulse which in this example is in the first bit slot. The adder circuit will effectively output a binary value, at the XOR gate output 38, representing the number of words of this format which have been received.

Figure 7:
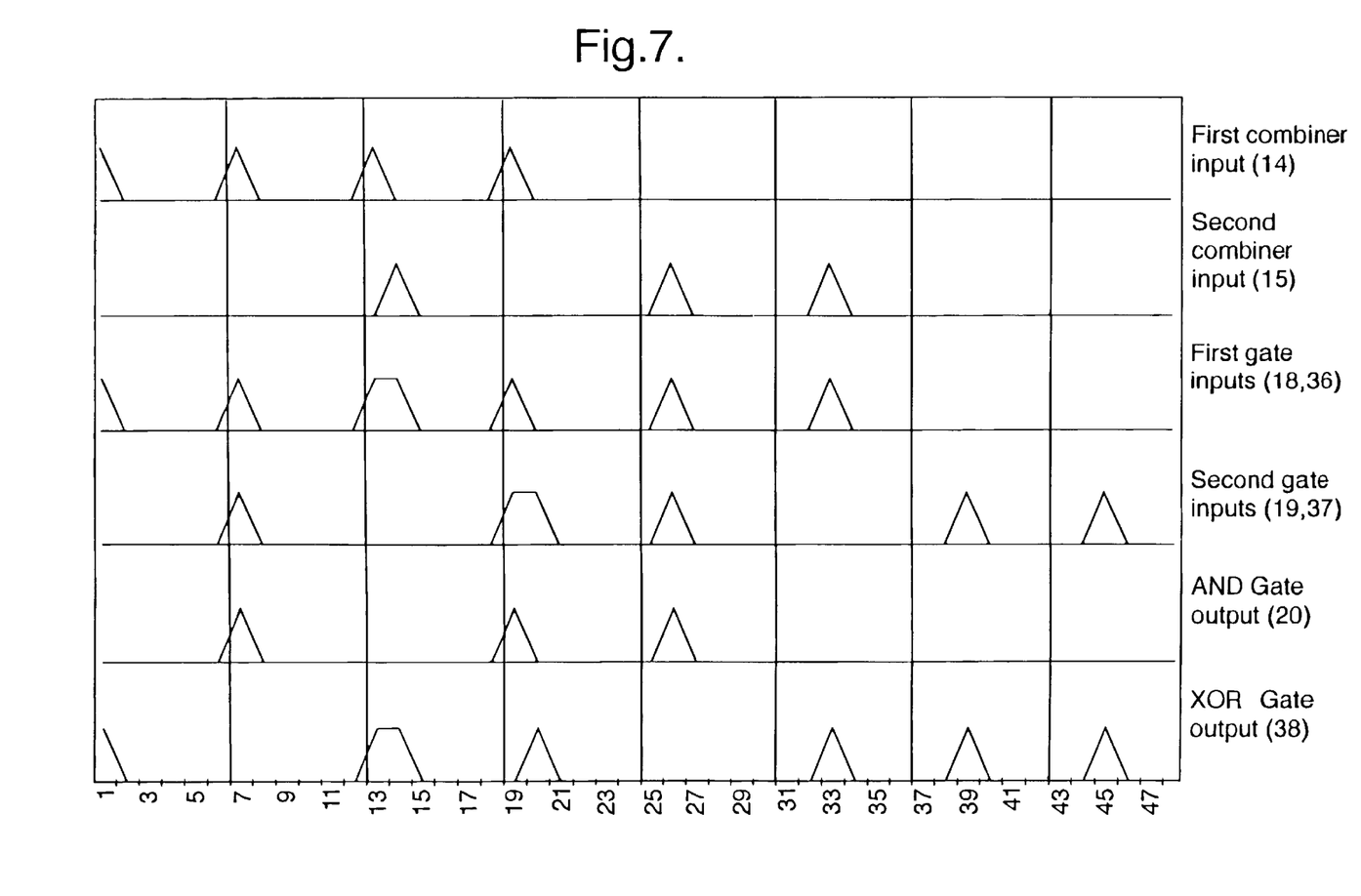
FIG. 7 shows bit slot time lines indicating the presence of optical pulses to several locations round the binary adder of FIG. 2 for an alternative input pulse stream.

In the present example, shown in FIG. 7 and Table 3, the input 12 supplies a sequence of four six bit slot length words (i.e. L=6), each word having a single optical pulse in the first bit slot, to the first combiner input 14.

When the first binary word is transferred from the input 12 to the first input 14 of the optical combiner 14, during bit slots 1–6, there are no other optical pulses present in the circuit. Consequently, the first word is transferred via the combiner 13 to the AND gate 17, which generates an output containing no optical pulses at the AND gate output 20, as shown in FIG. 7 and Table 3.

TABLE 3

| Bit Slot | First Combiner Input (14) | Second Combiner Input (15) | First Gate Inputs (18 & 36) | Second Gate Inputs (19 & 37) | AND Gate Output (20) | XOR Gate Output (38) |
|---|---|---|---|---|---|---|
| 1 | 1 | 0 | 1 | 0 | 0 | 1 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 1 | 0 | 1 | 1 | 1 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 1 | 0 | 1 | 0 | 0 | 1 |
| 14 | 0 | 1 | 1 | 0 | 0 | 1 |
| 15 | 0 | 0 | 0 | 0 | 0 | 0 |
| 16 | 0 | 0 | 0 | 0 | 0 | 0 |
| 17 | 0 | 0 | 0 | 0 | 0 | 0 |
| 18 | 0 | 0 | 0 | 0 | 0 | 0 |
| 19 | 1 | 0 | 1 | 1 | 1 | 0 |
| 20 | 0 | 0 | 0 | 1 | 0 | 1 |
| 21 | 0 | 0 | 0 | 0 | 0 | 0 |
| 22 | 0 | 0 | 0 | 0 | 0 | 0 |
| 23 | 0 | 0 | 0 | 0 | 0 | 0 |
| 24 | 0 | 0 | 0 | 0 | 0 | 0 |
| 25 | 0 | 0 | 0 | 0 | 0 | 0 |
| 26 | 0 | 1 | 1 | 1 | 1 | 0 |
| 27 | 0 | 0 | 0 | 0 | 0 | 0 |
| 28 | 0 | 0 | 0 | 0 | 0 | 0 |
| 29 | 0 | 0 | 0 | 0 | 0 | 0 |
| 30 | 0 | 0 | 0 | 0 | 0 | 0 |
| 31 | 0 | 0 | 0 | 0 | 0 | 0 |
| 32 | 0 | 0 | 0 | 0 | 0 | 0 |
| 33 | 0 | 1 | 1 | 0 | 0 | 1 |
| 34 | 0 | 0 | 0 | 0 | 0 | 0 |
| 35 | 0 | 0 | 0 | 0 | 0 | 0 |
| 36 | 0 | 0 | 0 | 0 | 0 | 0 |
| 37 | 0 | 0 | 0 | 0 | 0 | 0 |
| 38 | 0 | 0 | 0 | 0 | 0 | 0 |
| 39 | 0 | 0 | 0 | 1 | 0 | 1 |
| 40 | 0 | 0 | 0 | 0 | 0 | 0 |
| 41 | 0 | 0 | 0 | 0 | 0 | 0 |
| 42 | 0 | 0 | 0 | 0 | 0 | 0 |
| 43 | 0 | 0 | 0 | 0 | 0 | 0 |
| 44 | 0 | 0 | 0 | 0 | 0 | 0 |
| 45 | 0 | 0 | 0 | 1 | 0 | 1 |
| 46 | 0 | 0 | 0 | 0 | 0 | 0 |
| 47 | 0 | 0 | 0 | 0 | 0 | 0 |
| 48 | 0 | 0 | 0 | 0 | 0 | 0 |
| 49 | 0 | 0 | 0 | 0 | 0 | 0 |
| 50 | 0 | 0 | 0 | 0 | 0 | 0 |
| 51 | 0 | 0 | 0 | 1 | 0 | 1 |
| 52 | 0 | 0 | 0 | 0 | 0 | 0 |
| 53 | 0 | 0 | 0 | 0 | 0 | 0 |
| 54 | 0 | 0 | 0 | 0 | 0 | 0 |
| 55 | 0 | 0 | 0 | 0 | 0 | 0 |
| 56 | 0 | 0 | 0 | 0 | 0 | 0 |
| 57 | 0 | 0 | 0 | 1 | 0 | 1 |
| 58 | 0 | 0 | 0 | 0 | 0 | 0 |
| 59 | 0 | 0 | 0 | 0 | 0 | 0 |
| 60 | 0 | 0 | 0 | 0 | 0 | 0 |

The first word is also transferred to the XOR gate 35, which generates a copy of the word at the XOR gate output 38. This is transferred to the delay line 32, which introduces a time delay equivalent to L bit slots (i.e. 6 bit slots), such that the word is transferred to the second AND gate input 19 and the second XOR gate input 37 during bit slots 7–12.

Simultaneously, during bit slots 7–12, the second binary word is transferred to the first combiner input 14. Again, with no optical pulses present at the second combiner input 15, the second binary word is simply transferred to the first AND gate input 18 and the first XOR gate input 36, as shown in Table 3 and FIG. 7.

The XOR gate 35 generates an optical XOR word representing the logical XOR combination of the first and second words at the output 38, which contains no optical pulses.

Simultaneously, the AND gate 17 generates an optical AND word representing the logical AND combination of the first and second words at the AND gate output 20. This is transferred to the delay line 22 and, after being delayed by a time interval of L+1 bit slots (i.e. 7 bit slots), the optical AND word is transferred to the second combiner input, during bit slots 14–19.

The third binary word is received at the first input 14 of the combiner 13 during bit slots 13–18 and combined with the optical AND word generated during bit slots 6–11, to generate a combination optical word. This combination optical word, shown in Table 3, is transferred to the first gate inputs 18, 36 of the AND gate 17 and the XOR gate 35, during bit slots 13–18.

The second gate inputs 19, 37 have no optical pulses supplied at this time by virtue of the optical XOR word generated during bit slot 7–12 having no optical pulses.

Accordingly, the XOR gate 35 generates an optical XOR word, which, a there are no optical pulses present at the second XOR gate input 37, is a copy of the combination optical word. This optical XOR word is transferred to the delay line 32 and, after being delayed by a time interval of L bit slots (i.e. 6 bit slots), is transferred to the second AND gate input 19 and the second XOR gate input 37, during bit slots 19–24.

The AND gate generates an optical AND word containing no optical pulses. Consequently, there are no optical pulses present at the second combiner input 15, during bit slots 19–24, when the fourth binary word is received by the first combiner input 14 and the fourth binary word is transferred to the first gate outputs 18, 36.

Thus during bit slots 19–24, the XOR gate 35 and the AND gate 17 receive the optical XOR word generated during bit slots 13–18, and, the fourth binary word. From these, further AND and XOR optical words are generated and output from the AND and XOR gate outputs 38, 20, respectively.

These further words are again delayed by the respective delay lines 32, 22 and returned to the first and second AND and XOR gate inputs 18, 19, 36, 37.

With no further binary words being transferred from the input 12, the optical AND word is transferred to the first AND gate input 20 and the first XOR gate input 36, during bit slots 26–31. Meanwhile, the optical XOR word is transferred to the second gate inputs 19, 37, during bit slots 25–30.

This process is repeated until there are no optical pulses present at the output 20 of the AND gate 17, for an entire L bit slot duration, i.e. the optical AND word contains no optical pulses as shown during bit slots 31–36, in FIG. 7 and Table 3. At this time the optical XOR word output from the XOR gate output 38 is an optical binary word with a binary value "100", representing the decimal value "4". Thus the circuit counts the number of incoming binary words, as long as the binary words have the required format.

It should be noted that in the current example, the maximum binary value that can be counted is "111111" (i.e. decimal value "63"). This limitation is imposed by virtue of the binary words having only 6 bit slots. Thus, by increasing the number of bit slots, the maximum value that can be counted increases. Expressed mathematically, the maximum decimal value to which the circuit can count is $(2^L-1)$, where L is the number of optical bit slots in the optical binary words.

A fourth example of the operation of the binary adder of FIG. 2 is shown in Table 4. In this case the circuit again operates as a simple counter with a single optical pulse in the last bit slot of the input optical binary words. Accordingly, the delay line 22 of FIG. 2 would be replaced by an L–1 bit slot delay.

Table 4 is to be interpreted in a similar manner to Table 3, except that the AND word output from the AND gate output 20 is delayed by L–1 bit slots (i.e. 5 bit slots) before being transferred to the second combiner input. Accordingly, operation in accordance with Table 4 will not be described in detail.

Again reset of the circuit may be achieved by the use of an optical bit slot window, each of the optical bit slots containing no optical pulse, in a similar manner to that described with reference to FIGS. 5 and 6.

Figure 8:
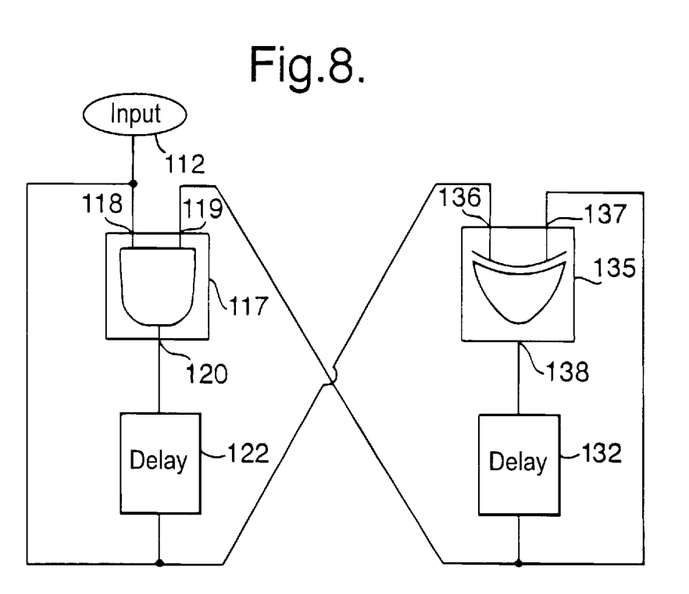
FIG. 8 shows a schematic representation of the configuration of the logic gates used in a binary adder according to a second embodiment of the present invention; and, FIG. 9 shows a schematic representation of the configuration of the logic gates used in a binary adder according to a third embodiment of the present invention.

A second embodiment of the present invention is shown in schematic form in FIG. 8 which shows a schematic representation of the configuration of the logic gates used for this alternative design. Components in FIG. 8 identical to those in FIG. 4 are indicted by equivalent reference numerals except increased by 100.

TABLE 4

| Bit Slot | First Combiner Input (14) | Second Combiner Input (15) | First Gate Inputs (18 & 36) | Second Gate Inputs (19 & 37) | AND Gate Output (20) | XOR Gate Output (38) |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 1 | 0 | 1 | 0 | 0 | 1 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 1 | 0 | 1 | 1 | 1 | 0 |
| 13 | 0 | 0 | 0 | 0 | 0 | 0 |
| 14 | 0 | 0 | 0 | 0 | 0 | 0 |
| 15 | 0 | 0 | 0 | 0 | 0 | 0 |
| 16 | 0 | 0 | 0 | 0 | 0 | 0 |
| 17 | 0 | 1 | 1 | 0 | 0 | 1 |
| 18 | 1 | 0 | 1 | 0 | 0 | 1 |
| 19 | 0 | 0 | 0 | 0 | 0 | 0 |
| 20 | 0 | 0 | 0 | 0 | 0 | 0 |
| 21 | 0 | 0 | 0 | 0 | 0 | 0 |
| 22 | 0 | 0 | 0 | 0 | 0 | 0 |
| 23 | 0 | 0 | 0 | 1 | 0 | 1 |
| 24 | 1 | 0 | 1 | 1 | 1 | 0 |
| 25 | 0 | 0 | 0 | 0 | 0 | 0 |
| 26 | 0 | 0 | 0 | 0 | 0 | 0 |
| 27 | 0 | 0 | 0 | 0 | 0 | 0 |
| 28 | 0 | 0 | 0 | 0 | 0 | 0 |
| 29 | 0 | 1 | 1 | 1 | 1 | 0 |
| 30 | 0 | 0 | 0 | 0 | 0 | 0 |
| 31 | 0 | 0 | 0 | 0 | 0 | 0 |
| 32 | 0 | 0 | 0 | 0 | 0 | 0 |
| 33 | 0 | 0 | 0 | 0 | 0 | 0 |
| 34 | 0 | 1 | 1 | 0 | 0 | 1 |
| 35 | 0 | 0 | 0 | 0 | 0 | 0 |
| 36 | 0 | 0 | 0 | 0 | 0 | 0 |
| 37 | 0 | 0 | 0 | 0 | 0 | 0 |
| 38 | 0 | 0 | 0 | 0 | 0 | 0 |
| 39 | 0 | 0 | 0 | 0 | 0 | 0 |
| 40 | 0 | 0 | 0 | 1 | 0 | 1 |
| 41 | 0 | 0 | 0 | 0 | 0 | 0 |
| 42 | 0 | 0 | 0 | 0 | 0 | 0 |
| 43 | 0 | 0 | 0 | 0 | 0 | 0 |
| 44 | 0 | 0 | 0 | 0 | 0 | 0 |
| 45 | 0 | 0 | 0 | 0 | 0 | 0 |
| 46 | 0 | 0 | 0 | 1 | 0 | 1 |
| 47 | 0 | 0 | 0 | 0 | 0 | 0 |
| 48 | 0 | 0 | 0 | 0 | 0 | 0 |
| 49 | 0 | 0 | 0 | 0 | 0 | 0 |
| 50 | 0 | 0 | 0 | 0 | 0 | 0 |
| 51 | 0 | 0 | 0 | 0 | 0 | 0 |
| 52 | 0 | 0 | 0 | 1 | 0 | 1 |
| 53 | 0 | 0 | 0 | 0 | 0 | 0 |
| 54 | 0 | 0 | 0 | 0 | 0 | 0 |
| 55 | 0 | 0 | 0 | 0 | 0 | 0 |
| 56 | 0 | 0 | 0 | 0 | 0 | 0 |
| 57 | 0 | 0 | 0 | 0 | 0 | 0 |
| 58 | 0 | 0 | 0 | 1 | 0 | 1 |
| 59 | 0 | 0 | 0 | 0 | 0 | 0 |
| 60 | 0 | 0 | 0 | 0 | 0 | 0 |

As shown in FIG. 8, the adder comprises an AND gate 117 and an XOR gate 135. The AND gate output 120 is coupled via a delay line 122, that introduces a L+1 bit slot delay, to the first AND gate input 118 and the first XOR gate input 136. The XOR gate output 138 is coupled via a delay line 122, that introduces an L bit slot delay, to the second AND gate input 119 and the second XOR gate input 137. An input 112, which supplies the words to be added is coupled to the first AND gate input 118 and the first XOR gate input 136.

Comparison of FIGS. 4 and 8 shows that FIG. 8 is similar to the apparatus of FIG. 4 with the optical combiner 13 removed. Examination of the optical pulses in FIG. 3 shows that the optical combiner 13 is not actually required to combine any optical pulses during this operation, primarily due to there being no optical pulses received by the combiner input 14 after the second binary word is supplied. Accordingly, it is possible for the adder to function without a combiner 13 as long as only two binary words are supplied to the combiner input 14.

Accordingly, FIG. 8 shows an example of a suitable apparatus configuration that could be used as an adder for adding two binary numbers as in the example described with respect to Table 1 and FIG. 3.

As will be appreciated, if the delay line 122 is replaced by an L−1 bit slot delay line, the apparatus of FIG. 8 can be used as a binary adder in a similar manner to the example set out in Table 2.

Figure 9:
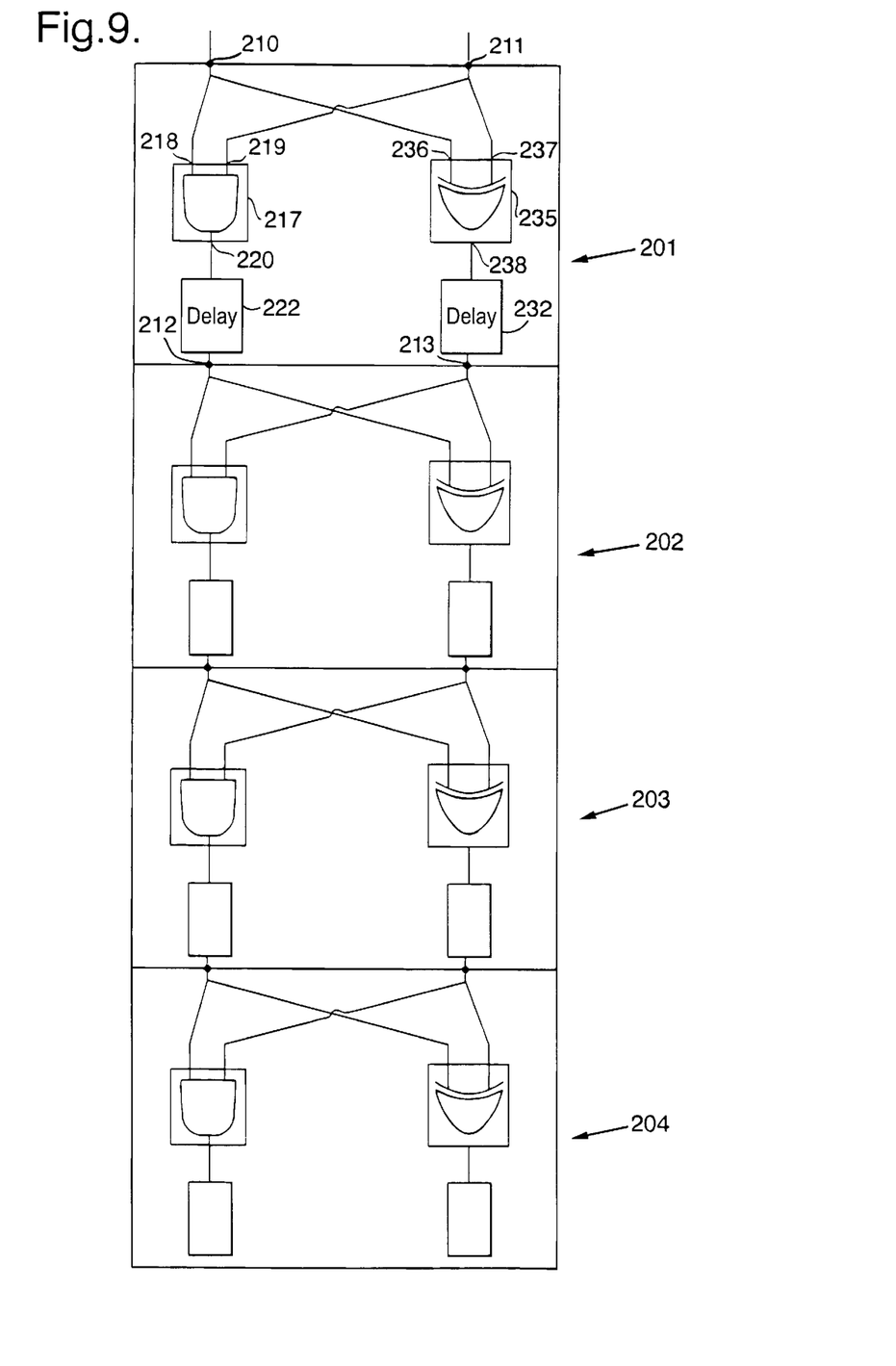

FIG. 9 shows a schematic representation of the configuration of the logic gates used in a binary adder according to a third embodiment of the present invention.

In this embodiment of the present invention, the use of feedback to repeatedly generate the optical XOR word and the optical AND word is replaced by a sequence of optical AND gate and XOR gate pairs 201, 202, 203, 204.

As each pair 201, 202, 203, 204 is identical and therefore only one will be described with reference to FIG. 9. The AND/XOR pair 201 comprises an AND gate 217 and an XOR gate 235. The first gate inputs 218, 236 of the AND gate 217 and the XOR gate 235 are connected together and to a first word input port 210 which receives the first word to be added. The Second gate inputs 219, 237 of the AND gate 217 and the XOR gate 235 are also connected together and to a second word input port 210 which receives the second word to be added.

The AND gate output 220 is coupled via a delay line 222, which introduces a M+1 bit slot delay, to an output port 212, whilst the XOR gate output 238 is coupled via a delay line 232, which introduces an M bit slot delay, to an output port 211.

Each AND/XOR pair will operate on first and second binary words received at the first and second input ports 210, 211 simultaneously, to generate an optical word representing the logical AND at the AND gate output 220 and an optical word representing the logical XOR at the XOR gate output 238. Transfer of the optical AND word and the optical XOR word, to the respective first and second output ports 212, 213, is delayed by M+1 and M bit slots respectively, such that the optical AND word is delayed by one additional bit slot with respect to the optical XOR word. The words are then output to the respective first and second input ports 210, 211 of the next AND/XOR gate pair 202.

The apparatus therefore functions as for the apparatus of FIG. 8, with the process of feedback being replaced by transfer to a subsequent AND/XOR gate pair. By ensuring that a sufficient number of AND/XOR gate pairs are provided in sequence, the AND gate output will eventually contain no optical pulses, in which case the optical XOR word generated by the respective XOR gate is the binary sum of the first and second words. The number of required AND/XOR gates cannot however be predetermined and this design does therefore require a sufficient AND/XOR gate pairs for the correct answer to be generated. However, by monitoring the optical AND word output from each AND/XOR gate pair, it is possible to determine which AND/XOR gate pair generates an optical XOR word representing the binary sum of the first and second words.

With no feedback loop, resetting of the apparatus is automatic, with no optical pulses remaining in the circuit once the result is generated. Furthermore as the requirement for the delay lines is only that the delay lines must delay the output words such that the optical AND word is offset by one bit slot with respect to the XOR word, then the total length of delay time may be reduced.

Thus, for example, if the circuit of FIG. 2 is used, for a large number of bit slots L, the transfer of words is delayed by L bit slots per feedback. However in the design of FIG. 9 the transfer is only delayed by M bit slots where, M can be controlled such that M<<L, thereby reducing the processing time.

It is however preferable to maintain a value of M>1 as single bit delays are difficult to achieve at high bit rates. Therefore by using a M+1 bit slot delay and an M bit slot delay, a relative offset of one bit slot can be conveniently achieved.

Again, an M−1 bit slot delay could be used instead of the M+1 bit slot delay if the correct format of binary word is used.

An alternative possibility is to couple a sequence of the optical AND/XOR gate pairs described in the third embodiment of the present invention, to a feedback system of the first embodiment of the present invention. This would enable the system to begin summing two binary words in the sequence of AND/XOR gate pairs whilst a previous calculation is being completed by the feedback system according to the first embodiment. Furthermore the number of AND/XOR gate pairs can be reduced whilst still enabling the binary sum of the first and second, optical words to be determined.

What is claimed is:

1. A summing apparatus for determining the sum of a first optical binary word and a second optical binary word, each binary word having a plurality of bit slots, the apparatus comprising:

at least one optical logic element of a first type and at least one optical logic element of a second type, each optical logic element including:
  receiving means for receiving binary words; and
  means for generating an output word that is a logical combination of the received binary words;
  wherein the or each logic element of the first type is configured to perform a function which results in a first functional combination on received words and wherein the or each logical element of the second type is configured to perform a function which results in a second functional combination on received words;

coupling means coupled to the logic elements so that the logic elements are coupled to one another by the coupling means such that in use and for each logic element, the output word from a logic element of one type is passed to a logic element of the same type and to a logic element of the other type; and delay means provided between the logic elements such that the output words from the different logic elements are delayed with respect to one another by at least one bit slot.

2. A summing apparatus as claimed in claim 1, wherein the first functional combination is an AND combination and the second functional combination is an XOR combination.

3. A summing apparatus as claimed in claim 1, wherein the coupling means is arranged such that in use the output words of a first element of the first type and a second element of the second type are each received at both the first and second elements, the delay means is arranged such that in use the output words of the first and second elements are recursively combined, and the output word of one of the logical elements becomes equal to the sum of the received first and second binary words after one or more recursions.

4. A summing apparatus as claimed in claim 3, wherein each binary word has L bit slots, and wherein the delay means comprises a first delay line and a second delay line, the first and second delay lines being arranged to delay the output words from the first and second elements by L+1 and L bit slots respectively.

5. A summing apparatus as claimed in claim 3, wherein each element has a first input and a second input, and the summing apparatus further comprises a summing input coupled to the first inputs of each of the first and second elements such that the first and second words can be applied in succession to the summing input.

6. A summing apparatus as claimed in claim 3, wherein each element has an output, the output of the first element being coupled through a first delay line to the first inputs of a first and second elements, and wherein the output of the second element is coupled through a second delay line to a second inputs of the first and second elements.

7. A summing apparatus as claimed in claim 1, wherein each logic element comprises a non-linear optical gate having a switching input, a non-switching input and an output, the switching input controls an optical connection between the output and the non-switching input of the gate, the optical connection is formed when an optical pulse is received at the switching input, and the optical connection is not formed when two pulses are received at the switching input.

8. A summing apparatus as claimed in claim 7, wherein the or each second element further includes a source of optical pulses and an optical combiner, the optical combiner being arranged to combine the optical intensity from the first and second inputs of the second element, the optical combiner having an output coupled to the switching input of the non-linear optical gate, the optical pulse source being coupled to the non-switching input such that a pulse is produced at the output of the non-linear optical gate when a pulse is received at either of the first or second inputs of the second element, in the manner of an XOR gate.

9. A summing apparatus as claimed in claim 8, further comprising a re-setting means for interrupting the source of optical pulses such that the summing apparatus can be re-set once the first and second binary words have been summed.

10. A summing apparatus as claimed in claim 1, wherein there are provided a plurality of elements of the first type and a plurality of elements of the second type, the output word from each element being passed to another element of same type and to another element of a different type.

11. A summing apparatus as claimed in claim 1, wherein the or each element of the first type is an AND gate and the or each element of the second type is an XOR gate.

12. A method of summing a pair of binary words having a plurality of bit slots using one or more elements of a first type and one or more elements of a second type, the or each element of the first type being arranged to perform a first function on words applied thereto, the or each element of the second type being arranged to perform a second function on words applied thereto, the method comprising the steps of:

(i) inputting the pair of words into a logic element of the first type, thereby generating a first output word;

(ii) inputting the pair of words into a logic element of the second type thereby generating a second output word;

(iii) receiving the output words from the logic elements of the first and second types and delaying one of the output words by at least one bit slot relative to the other output word, thereby offsetting the two output words;

(iv) applying the output words thereby offset to a logic element of the first type;

(v) applying the output words thereby offset to logic element of the second type; and (vi) repeating steps (iii) to (v) until the sum of the first and second binary words is produced at the output of one of the logic elements.

13. A method as claimed in claim 12, wherein the first function is an AND function, and the second function is an XOR function.

14. A method as claimed in claim 13, wherein in step (iii) the two output words are offset by delaying one of the output words by one bit slot relative to the other output word.

* * * * *